United States Patent Office 3,632,767
Patented Jan. 4, 1972

3,632,767
TREATMENT OF DEPRESSION WITH
4-SUBSTITUTED PIPERIDINES
Allan P. Gray, Bedford Village, and Donald E. Heitmeier, Brewster, N.Y., and Morton E. Goldberg, Glen Rock, N.J., assignors to Mallinckrodt Chemical Works, St. Louis, Mo.
No Drawing. Filed Feb. 12, 1968, Ser. No. 704,536
Int. Cl. A61k 27/00
U.S. Cl. 424—267  2 Claims

ABSTRACT OF THE DISCLOSURE

4-Substituted-piperidines such as 4 - benzylpiperidine are used as antidepressants in mammals.

The invention relates to the use of 4-substituted-piperidines as antidepressant agents in mammals, and to certain 4-substituted-piperidines per se as new compositions of matter.

2-substituted-piperidines have been found to be central nervous system stimulants of the amphetamine type. Examples include the 2 - (1-phenyl-lower alkyl)-piperidines disclosed in U.S. Pat. No. 2,830,057. The 4-(ortho-substituted-phenyl) piperidines of U.S. Patent No. 2,891,066 were disclosed to be central nervous system depressant. The present invention is based upon the discovery that certain 4-substituted-piperidines, which are described below, have antidepressant properties at dosage levels that do not display stimulating effects. At higher dosage levels, the 4-substituted-piperdines of the invention act as stimulants without excitation of the sympathetic nervous system, i.e., without showing amphetamine-like stimulating effects.

The 4-substituted-piperidines that have been found to have useful antidepressant properties can be represented by Formula I:

I

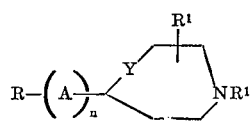

wherein R represents phenyl, cyclohexyl, or phenyl substituted with lower alkoxy (e.g., alkoxy of up to four carbon atoms), lower alkyl (e.g., alkyl of up to four carbon atoms), halo, amino, or N-hydroxyacetamido; wherein A represents alkylene of up to six carbon atoms provided that the R variable and the 4-piperidyl group are separated by not more than two carbon atoms, carbonyl, or hydroxymethylene; wherein $n$ represents zero or one; wherein Y represents either a single or a double bond; and wherein each $R^1$ individually represents hydrogen or methyl. The following compounds illustrate those that are represented by Formula I:

4-phenylpiperidine,
4-benzylpiperidine,
4-(2-phenylethyl)piperidine,
4-(cyclohexylmethyl)piperidine,
4-(p-methoxybenzyl)piperidine,
4-(p-chlorobenzyl)piperidine,
4-(o-methylbenzyl)piperidine,
4-(p-aminobenzyl)piperidine,
4-[p-(N-hydroxyacetamido)benzyl]piperidine,
4-benzoylpiperidine,
4-(p-methoxyphenyl-hydroxymethyl)piperidine,
4-benzyl-3-piperidine,
4-(m-ethylbenzyl)piperidine,
4-benzyl-3-methyl-piperidine,
4-phenyl-3-piperideine,
N-methyl-4-phenyl-3-piperideine,
and the like.

The preferred antidepressant compounds of the invention are the 4-benzylpiperidines that are represented by Formula II:

II 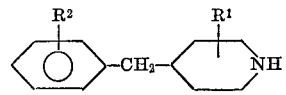

wherein $R^1$ represents hydrogen or methyl, and wherein $R^2$ represents hydrogen, methyl, methoxy, amino, or chloro. Among the compounds included within Formula II are:

4-benzylpiperidine,
4-(p-methoxybenzyl)piperidine,
4-(p-chlorobenzyl)piperidine,
4-(p-aminobenzyl)piperidine,
4-(o-methylbenzyl)piperidine, and the like.

The most preferred antidepressant compound of the invention is 4-benzylpiperidine.

In connection with the discovery that some 4-substituted-piperidines have useful antidepressant properties, a novel class of 4-substituted-piperidines and 4 - substituted 3-piperideines was discovered. These novel compounds include the 4-benzylpiperidines that are represented by Formula III:

III 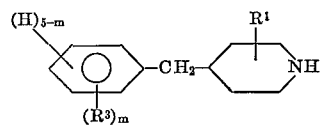

wherein $R^1$ represents hydrogen or methyl, wherein $m$ represents 1 or 2, and wherein $R^3$ represents lower alkyl, lower alkoxy, halo, amino, acetamido, N-hydroxyacetamido, nitro, or trifluoromethyl. The novel compounds also include the 4-benzyl-3-piperideines that are represented by Formula IV:

IV 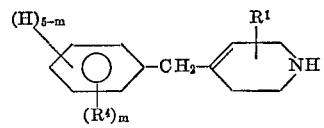

wherein $R^1$ represents hydrogen or methyl, wherein $m$ represents 1 or 2, and wherein $R^4$ represents hydrogen, lower alkyl, lower alkoxy, halogen, amino, acetamido, N - hydroxyacetamido, nitro, or trifluoromethyl. The novel compounds also include 4 - benzoyl-piperidines and 4 - (alpha-hydroxybenzyl)piperidines that are represented by Formulas V and VI:

V 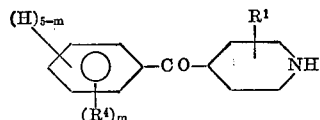

VI 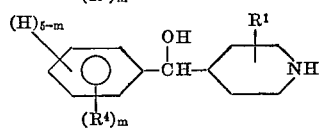

wherein $m$, $R^1$ and $R^4$ have the meaning stated above with respect to Formula IV.

The novel compounds of the invention, in addition to those that were mentioned above with respect to Formulas I and II, include:

4-(p-acetamidobenzyl)piperidine,
4-(m-trifluoromethylbenzyl)piperidine,
4-(alpha-hydroxy-m-trifluoromethylbenzyl)piperidine,
4-(2,4-dinitrobenzyl)piperidine,
4-(2,4-diethylbenzyl)piperidine,
4-(2,4-diaminobenzyl)piperidine,
4-(2,4-diacetamidobenzyl)piperidine,
4-[2,4-bis(N-hydroxyacetamido)benzyl]piperidine,
4-(p-aminobenzyl)-3-piperideine,
4-(p-methylbenzyl)-3-piperideine,
4-(m-trifluoromethylbenzyl)-3-piperideine,
4-(p-methoxybenzyl)-3-piperideine,
4-(p-acetamidobenzyl)-3-piperideine,
4-(2,4-dinitrobenzyl)-3-piperideine,
4-(2,4-diaminobenzyl)-3-piperideine,
4-(p-chlorobenzyl)piperidine,
4-(p-methoxybenzoyl)piperidine,
4-(m-trifluoromethylbenzoyl)piperidine,
4-(p-nitrobenzoyl)piperidine,
4-(p-ethylbenzoyl)piperidine,
4-(p-aminobenzoyl)piperidine,
4-(2,4-dinitrobenzoyl)piperidine,
4-(2,4-diaminobenzoyl)piperidine,
4-(p-acetamidobenzoyl)piperidine,
4-[p-(N-hydroxyacetamido)benzoyl]piperidine,
4-(p-bromobenzoyl)piperidine,
4-(alpha-hydroxybenzyl)piperidine,
4-(alpha-hydroxy-m-trifluoromethylbenzyl)piperidine,
4-(alpha-hydroxy-p-aminobenzyl)piperidine,
4-(alpha-hydroxy-p-methylbenzyl)piperidine,
4-(alpha-hydroxy-p-acetamidobenzyl)piperidine,
4-(alpha-hydroxy-p-chlorobenzyl)piperidine,
4-[alpha-hydroxy-p-(N-hydroxyacetamido)benzyl]piperidine, and the like.

Known synthetic techniques can be applied to the production of the 4-substituted-piperidines of the invention. 4-benzylpiperidine, 4-(2-phenylethyl)piperidine, 4-(cyclohexylmethyl)piperidine, 4-phenylpiperidine, 4-phenyl-3-piperideine, and N-methyl-4-phenyl-3-piperideine are known compounds. The novel 4-benzylpiperidines that are employed in the invention can be prepared by a sequence of reactions starting with 4-cyano-pyridine or a methyl-substituted-4-cyanopyridine and a phenyl magnesium bromide:

(a)
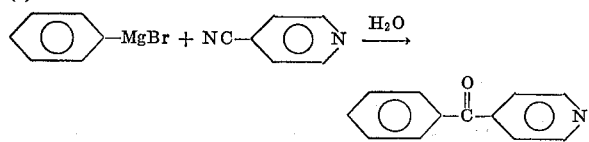

The 4-benzoylpyridine is then reduced to the corresponding benzyl compound:

(b)
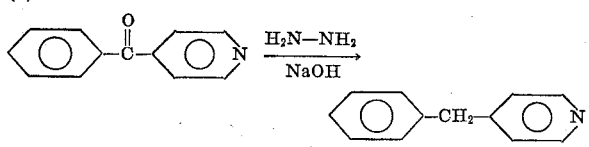

the 4-benzylpyridine is then hydrogenated to the 4-benzylpiperidine:

(c)
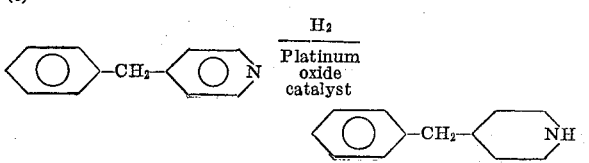

The reaction of a Grignard reagent with a nitrile followed by hydrolysis to a ketone, i.e., reaction (a) above, is an elementary synthetic reaction (reference—page 184, "The Chemistry of Organic Reactions" by Conant and Blatt, The MacMillan Company, New York, 1949). Reaction (b) above is known as the Wolff-Kishner reduction (reference pages 580–581, "Organic Chemistry" by Fieser & Fieser, 2nd edition, D.C. Heath and Company, 1950) and is best carried out by refluxing the ketone in a water-miscible solvent such as ethylene glycol, with aqueous hydrazine and sodium hydroxide. At first, a hydrazone is formed which is decomposed to the desired methylene group by raising the temperature of the reaction mixture by distilling off water. Thus, the overall series of reactions that occurs in step (b) is as follows:

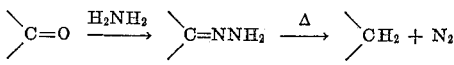

Reaction (c), above, is a hydrogenation using platinum oxide as the catalyst. This hydrogenation, which is carried out by well known techniques, reduces the pyridine moiety to a piperidine moiety without reducing the benzene ring to a cycloaliphatic ring. Rhodium on carbon can also be used as the hydrogenation catalyst for reaction (c) in many cases.

The foregoing sequence of reactions (a), (b), and (c) can be employed to produce 4-benzylpiperidines wherein the benzene ring can have alkyl, alkoxy, chloro, trifluoromethyl, or amino substituents. Nitro substituents can be present, although they will be reduced to amino groups during the synthesis. The 4-(2-phenylethyl)-piperidines and other 4-(phenylalkyl)piperidines can be prepared by the following known reactions:

(d) Reaction of a phenylalkyl chloride such as benzyl chloride with a 4-alkylpyridine (e.g. gammapicoline) in the presence of sodamide in liquid ammonia:

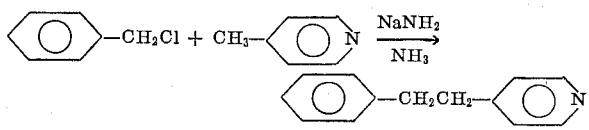

The resulting 4-(2-phenylethyl)pyridine can then be hydrogenated using platinum oxide catalyst, i.e., reaction (c), to produce the 4-(2-phenylethyl)piperidine. The benzene ring in this series of reactions can have alkyl, trifluoromethyl, alkoxy or chloro substituent groups. To produce a compound containing an amino substituent on the benzene ring, a nitro-substituted benzyl chloride can be used as the starting reactant in reaction (d). The nitro group is reduced to the desired amino group during the hydrogenation reaction.

The acetamido group on the benzene ring can be introduced by reacting acetyl chloride with an amino-substituted compound by known procedures. The acetamido group can be introduced during the synthesis prior to the reduction of the pyridine to the piperidine compound. For instance, a 4-(amino-benzyl)pyridine can be reacted with acetyl chloride to produce a 4-(acetamidobenzyl)pyridine which can then be hydrogenated by reaction (c), above, to yield the corresponding piperidine. A 4-(phenylalkyl)-pyridine can be nitrated by conventional procedures to introduce a nitro group on the benzene ring. The nitro group can then be reduced to the amino group by reacting the nitrated compound with the usual reagents such as iron powder and acetic acid or stannous chloride and hydrochloric acid. Then, after reaction with acetyl chloride to produce the acetamido-substituted compound, hydrogenation by reaction (c) can be carried out to produce the desired 4-(acetamidophenylalkyl)pyridine.

The N-hydroxyacetamido group is introduced on the benzene ring by reducing a nitro group in the presence of an acetylating agent such as acetic anhydride. An intermediate stage in the reduction of a nitro group is a hydroxylamino group. When an acetylating agent is present, the hydroxylamino group can be acetylated to produce the N-hydroxyacetamido group before further reduction occurs.

Nitro groups can be introduced on the benzene ring as the last step of the synthesis, i.e., after all reductions have been carried out. Well known nitrating techniques can be employed, such as by reacting 4-benzylpiperidine or 4-(2-phenylethyl)piperidine with a mixture of nitric acid and sulfuric acid.

The foregoing synthetic techniques are applicable in the preparation of 4-benzylpiperidines and 4-(phenylalkyl)piperidines. The 4-substituted-3-piperideines of the invention can be prepared by analogous procedures with the exception that the reduction of the corresponding 4-pyridine is carried out differently. Thus, the starting reactants can be the same as those indicated above for the sequence of reactions (a) and (b), or for reaction (d). Thereafter, the 4-pyridine is reduced to the corresponding 3-piperideine, for example by reaction with lithium aluminum hydride in the presence of AlCl₃:

(e) 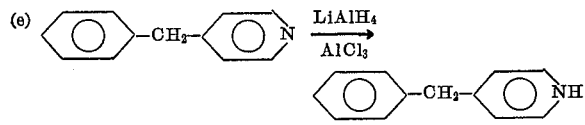

The comments above with respect to the introduction of acetamido, N-hydroxyacetamido, amino, and nitro groups are also applicable to the piperideines containing these groups.

The 4-(alpha-hydroxybenzyl)piperidines can be produced by the following sequence of reactions:

(a) 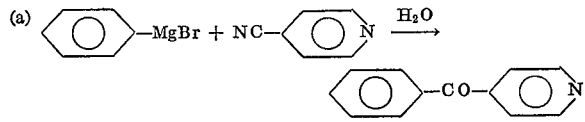

[This is the same reaction (a) discussed above.]

(f) A hydrogenation similar to reaction (c) above except that the product of reaction (a), a ketone, is used as the starting reactant instead of the benzylpyridine:

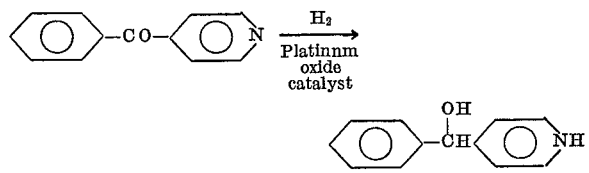

If the reduction is carried out by using lithium aluminum hydride as the reducing agent, the product is a piperideine:

(g) 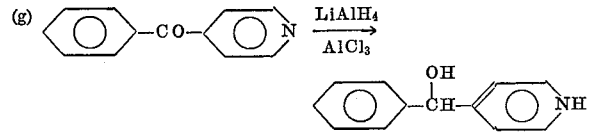

In producing the alpha-hydroxybenzyl compounds by the routes described above, the benzene ring can be substituted with alkyl, alkoxy, chloro, trifluoromethyl, or amino. Acetamido, nitro, amino or N-acetamido groups can be introduced by procedures analogous to those described above.

The 4-benzoylpiperidines and 4-benzoyl-3-piperideines can be produced from the corresponding alpha-hydroxybenzyl compound by known oxidation reactions. For instance, chromic oxide or acid in acetic acid can be used as the oxidizing agent:

(h) 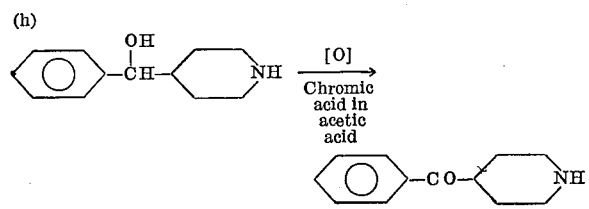

The N-methyl compounds that are within the scope of Formula I can be produced by known synthetic techniques. For instance, the corresponding piperidine or 3-piperideine can be methylated by reaction with formaldehyde and formic acid:

(i) 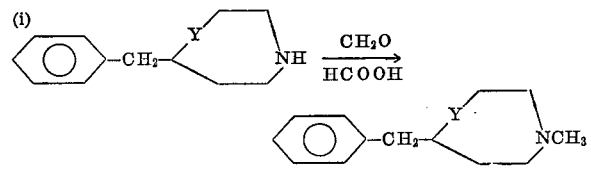

The benzene ring can be substituted with alkyl, trifluoromethyl, alkoxy, or halo during reaction (i). Nitro, amino, acetamido, and N-hydroxyacetamido substituents can be introduced in the N-methyl compound by the procedures discussed above.

The 4-(substituted-phenyl)piperidines that are within the scope of Formula I can be produced by reacting a substituted styrene with formaldehyde and ammonia in the presence of acid:

(j) 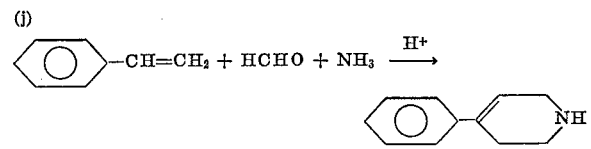

The piperideine can then be reduced to form the corresponding piperidine. The styrene can be substituted with alkyl, alkoxy or trifluoromethyl. Amino, nitro, acetamido, or N-hydroxyacetamido groups can be introduced by the methods discussed above.

Halo groups, i.e., fluoro, chloro, bromo or iodo groups, can be introduced on the benzene ring of the subject 4-substituted-piperidines and piperideines by the well known Sandmeyer reaction or the Schiemann modification thereof:

The Sandmeyer reaction is:

(k) 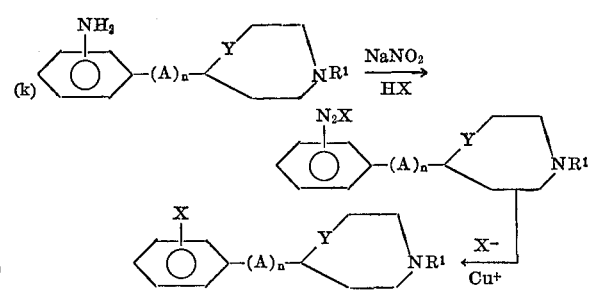

wherein X can be chloro, bromo or iodo.

The Schiemann modification is as follows (showing only the benzene moiety of the piperidine or or piperideine).

(l) 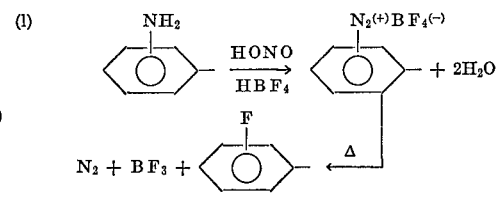

The novel compounds that are represented by Formulas III, IV, V and VI are widely useful. For instance, they can be used as reaction intermediates in the synthesis of new compounds. Since all of these compounds contain amino groups, they can be used as acid acceptors in processes such as the process for producing cyclopentadienyl metal compounds disclosed in U.S. Patent No. 3,071,605. Since all of the compounds of Formulas III, IV, V and VI are amines containing a reactive hydrogen, they can be used as reactive catalysts in the reactions of isocyanates and epoxides with active hydrogen compounds. The compounds of Formulas III, IV, V and VI can be reacted with ethylene oxide to form surfactants useful in detergent compositions.

The compounds that are defined by Formula I are useful pharmacologically as antidepressants in mammals. The compounds can be administered in accordance with procedures that are well known in the pharmacological and therapeutic arts. The compounds will normally be employed in the form of non-toxic acid addition salts since such salts have desirable solubility properties.

Typical eamples of pharmacologically useful and acceptable non-toxic acid addition salts of the present 4-substituted-piperidines are those formed with hydrochloric acid, phosphoric acid, acetic acid, sulfuric acid, methanesulfonic acid, maleic acid, tannic acid, lactic acid, tartaric acid, citric acid, and the like. The hydrochloric acid addition salts are preferred.

The antidepressant compounds of the invention can be employed with a suitable pharmaceutical carrier for administration by standard methods such as orally and parenterally, preferably intramuscularly. As ingredients of the carrier, there can be used gelatine, lactose, starch, magnesium stearate, vegetable oils, gums, polyalkylene glycols, or the like. The pharmaceutical preparations can be in the form of tablets, capsules, dragees, solutions, suspensions or emulsions. They can be sterilized, if desired, and the preparations can contain auxiliary substances such as preservatives, stabilizing, wetting or emulsifying agents, salts which vary the osmotic pressure and buffering agents. They may also contain other therapeutically valuable substances. The pharmaceutical preparations are formulated by the usual methods.

The examples below illustrate the invention.

Examples 1–9 illustrate the preparation of intermediates, and Examples 10–22 illustrate the preparation of certain of the novel compounds of the invention.

EXAMPLE 1

4-(p-methoxybenzoyl)pyridine

To the cold Grignard reagent prepared from 27 g. (1.1 g. atoms) of magnesium and 200 g. (1.07 moles) of p-bromoanisole in 300 ml. of dry ether and 150 ml. of benzene was added dropwise in 3 hours a solution of 100 g. (0.96 mole) of 4-cyanopyridine in 300 ml. of benzene and 200 ml. of ether. After being allowed to stand overnight at room temperature, the mixture was warmed for 30 minutes on the steam bath and then decomposed by pouring it on to ice and water containing 200 g. of ammonium chloride. The ether benzene layer was separated and extracted with 10% hydrochloric acid. The acid layer was separated and made basic with 20% sodium hydroxide to precipitate a white solid that crystallized from isopropyl alcohol to give 152.9 g. (72%) of product M.P. 120–122° C.

Analysis.—Calc. for $C_{13}H_{11}NO_2$ (percent): N, 6.57. Found (percent): N(basic), 6.55.

EXAMPLE 2

4-(m-trifluoromethylbenzoyl) pyridine was prepared similarly from 4-cyanopyridine and the Grignard reagent of 3-bromotrifluoromethylbenzene to give 52% of product, B.P. 100–108° C. (0.1 mm.) $n_D^{24}$ 1.5372.

Analysis.—Calc. for $C_{13}H_8F_3NO$ (percent): N, 5.58. Found (percent): N(basic), 5.57.

EXAMPLE 3

4-(m-trifluoromethylbenzyl)pyridine

A mixture of 84 g. (0.33 mole) of 4-(m-trifluoromethylbenzoyl)-pyridine, 300 ml. of ethylene glycol (or diethylene glycol), 50 g. of sodium hydroxide and 35 g. (1 mole) of 95% hydrazine was stirred and gradually heated to 110° C. whereon the mixture became homogeneous. As the temperature was raised to 120–130° C., the mixture began to evolve nitrogen and the reaction became quite vigorous shortly thereafter. The temperature was raised to 160° C. after the gas evolution had slowed and the reaction mixture was held at this temperature for 2 hours longer. The mixture was cooled and diluted with two volume of water and extracted with ether. Distillation of the dried ether extract gave 64.9 g. (83%) of product, B.P. 87–89° C. (0.10 mm.) $n_D^{24}$ 1.5153.

Analysis.—Calc. for $C_{13}H_{10}F_3N$ (percent): N, 5.90. Found (percent): N(basic), 5.91.

Other 4-benzylpyridines that were prepared similarly from the appropriate substituted 4-benzoylpyridine are listed in Table I.

TABLE I

| Example | Compound | Physical constants | Yield, percent | Basic nitrogen Calcd. | Found |
|---|---|---|---|---|---|
| 4 | 4-(p-methoxybenzyl)-pyridine | B.P. 129–139° (0.2 mm.) | 89 | 7.03 | 6.96 |
| 5 | 5-(o-methylbenzyl)-pyridine | B.P. 105–112° (0.2 mm.) | 81 | 7.64 | 7.64 |
| 6 | 4-(p-chlorobenzyl)-pyridine | B.P. 110–114° (0.2 mm.) | 86 | 6.88 | 6.83 |
| 7 | 4-benzyl-3-methyl-pyridine | B.P. 95–102° (0.2 mm.) | 80 | | |
| 8 | Hydrochloride salt | M.P. 184–186.5° | | *Analysis | |

*Calcd.: C, 71.06; H, 6.42; Cl, 16.14. Found: C, 71.04; H, 6.40; Cl (ionic), 16.14.

EXAMPLE 9

4-(p-acetamidobenzyl)pyridine

To a cold mixture of 7.2 g. (0.04 mole) of 4-(p-aminobenzyl)pyridine in 100 ml. of methylene chloride and 4.5 g. of triethylamine was added dropwise a solution of 3.3 g. (0.04 mole) of acetyl chloride in 20 ml. of methylene chloride. After 3 hours the mixture was washed twice with water, dried and concentrated leaving 4.8 g. of solid that crystallized from acetonitrile to give 3.7 g. of product, M.P. 168–170° C.

Analysis.—Calc. for $C_{14}H_{14}N_2O$ (percent): N (basic), 6.19. Found (percent): N(basic), 6.06.

EXAMPLE 10

4-(p-methoxybenzyl)piperidine

A solution of 20 g. (0.10 mole) of 4-(p-methoxybenzyl)-pyridine in 50 ml. of 5% hydrochloric acid was shaken in a Parr hydrogenation appaartus with 2 g. of 5% rhodium on carbon catalyst at an initial pressure of 50 lbs./sq. in. of hydrogen. The hydrogen absorption was complete in 26 hours. The catalyst was filtered off and the filtrate cooled and made basic with sodium hydroxide and extracted with ether and dried. Concentration of the ether solution left a solid that crystallized from hexane to give 16.7 g. (84% yield) of crystals, M.P. 59–61° C.

Analysis.—Calc. for $C_{13}H_{19}NO$ (percent): N, 6.83. Found (percent): N (basic), 6.80.

The hydrochloride salt showed M.P. 171°–173° C. when crystallized from acetonitrile.

Analysis.—Calc. for $C_{13}H_{20}ClNO$ (percent): C, 64.62; H, 8.34; Cl, 14.68. Found (percent): C, 64.87; H, 8.40; Cl (ionic), 14.89.

EXAMPLE 11

4-(m-trifluoromethylbenzyl)piperidine

A solution of 60 g. (0.25 mole) of 4-(m-trifluoromethylbenzyl)-pyridine in 325 ml. of water and 125 ml. of acetic acid was stirred in a Parr hydrogenator (1 liter size) with 2 g. of platinum oxide catalyst at an initial pressure of 385 lbs./sq./in. of hydrogen. Hydrogen absorption was complete in 4 hours after which the catalyst was filtered off. The aqueous acid solution was made strongly basic with sodium hydroxide, extracted with ether, and dried. The ether solution was concentrated and distilled to give 56.0 g. (92%) of product, B.P. 84°–92° C. (0.2 mm.), $n_D^{23}$ 1.4848.

Analysis.—Calc. for $C_{13}H_{16}F_3N$ (percent): N, 5.76. Found (percent): N (basic), 5.87.

The hydrochloride salt melted 145°–147° C. when crystallized from ethyl acetate.

Analysis.—Calc. for $C_{13}H_{17}ClF_3N$ (percent): C, 55.83; H, 6.13; Cl, 12.68. Found (percent): C, 56.21; H, 6.43; Cl (ionic), 12.68.

EXAMPLE 12

4-(p-acetamidobenzyl)piperidine hydrochloride

A solution of 3.7 g. (0.016 mole) of 4-(p-acetamidobenzyl)-pyridine in 125 ml. of glacial acetic acid was shaken with 0.3 g. of platinum oxide at an initial pressure of 50 lbs./sq. in. of hydrogen. After 7 hours the catalyst was filtered off and the filtrate was concentrated. The colorless residue was taken up in ice water, made basic with solid potassium carbonate and extracted with chloroform and dried. After concentrating the chloroform solution there remained an oil that was redissolved in chloroform, cooled and treated with ethereal hydrogen chloride to precipitate a hygroscopic solid that crystallized from isopropyl alcohol-ether to give 2.1 g. of product, M.P. 258–260° C.

Analysis.—Calc. for $C_{14}H_{21}ClN_2O$ (percent): C, 62.56; H, 7.88; Cl, 13.18. Found (percent): C, 62.61; H, 8.06; Cl (ionic), 13.14.

Other 4-benzylpiperidines that were prepared similarly from the appropriate 4-benzylpyridine (known or described herein) are shown in Table II.

Analysis.—Calc. for $C_{13}H_{19}NO_2$ (percent): N, 6.33. Found (percent): N (basic), 5.97.

The hydrochloride salt melted 161–163° C. when crystallized from acetone and dried at 80°.

Analysis.—Calc. for $C_{13}H_{20}ClNO$ (percent): C, 60.56; H, 7.82; Cl, 13.77. Found (percent): C, 60.77; H, 7.84; Cl (ionic), 13.19.

EXAMPLE 19

4-benzoylpiperidine

To a cold solution of 96 g. (0.50 mole) of 4-(α-hydroxybenzyl)piperidine in 500 ml. of acetic acid was added dropwise a solution of 40 g. (0.40 mole) of chromic oxide in 250 ml. of acetic acid and 50 ml. of water. The mixture was then allowed to stand at room temperature for 16 hours. The solution was concentrated on the rotor evaporator at 60° C. and the dark residue taken up in water, made basic with sodium hydroxide and extracted with ether and dried. The ether solution was concentrated leaving a yellow oil that solidified on cooling. The solid was crystallized from acetonitrile to give 64 g. of product, M.P. 53–57° C. One more recrystallization from acetonitrile raised the M.P. to 55–56° C.

Analysis. — Calc. for $C_{12}H_{15}NO$ (percent): N, 7.40. Found (percent): N (basic), 7.40.

The hydrochloride salt, when crystallized from isopropyl alcohol, melted 226–227° C.

Analysis.—Calc. for $C_{12}H_{16}ClNO$ (percent): C, 63.85; H, 7.14; Cl, 15.71. Found (percent): C, 63.80; H, 7.07; Cl $n_D^{25}$ 1.5570.

EXAMPLE 20

4-benzyl-3-piperideine

To a cold stirred mixture of 36 g. (0.95 mole) of lithium aluminum hydride in 1500 ml. of ether was added

TABLE II

| | | | Analysis | | | | | | |
|---|---|---|---|---|---|---|---|---|---|
| | | | Calculated | | | | Found | | |
| Ex. | Compound | Physical constants | C | H | Cl | Basic nitrogen | C | H | Cl | Basic nitrogen |
| 13 | 4-(p-chlorobenzyl)-piperidine | B.P. 98–104° C. (0.2 mm.), $n_D^{24}$ 1.5517 | | | | 6.68 | | | | 6.79 |
| | Hydrochloride salt | M.P. 198–199° C. | 58.53 | 6.96 | 14.40 | | 58.47 | 7.13 | 14.48 | |
| 14 | 4-(o-methylbenzyl)-piperidine | B.P. 98–104° C. 0.1 mm.), $n_D^{24}$ 1.5400 | | | | 7.40 | | | | 7.40 |
| | Hydrochloride salt | M.P. 213–213.5° C. | 69.14 | 8.93 | 15.70 | | 69.06 | 8.92 | 15.66 | |
| 15 | 4-(p-aminobenzyl)-piperidine | M.P. 109–111° C. | | | | 14.71 | | | | 14.71 |
| | Dihydrochloride salt | M.P. 283–285° C. | 54.75 | 7.66 | 26.98 | | 54.45 | 7.54 | 26.66 | |
| 16 | 4-benzyl-3-methyl-piperidine | B.P. 102–103° C. (0.25 mm.), $n_D^{24}$ 1.5311 | | | | 7.40 | | | | 7.43 |

EXAMPLE 17

4-(α-hydroxy-m-trifluoromethylbenzyl)piperidine

A solution of 25.1 g. (0.10 mole) of 4-m-trifluoromethylbenzoyl)pyridine in 150 ml. of methanol and 10 ml. of concentrated hydrochloric acid, was shaken with 1 g. of platinum oxide at an initial pressure of 50 lbs./sq. in. of hydrogen. The hydrogen uptake was complete in 5 hours. The catalyst was filtered off and the filtrate concentrated leaving an oil that was dissolved in water and made basic with sodium hydroxide and extracted with benzene and dried. The benzene solution was concentrated to give a crude product that crystallized from acetone-hexane to give 7.75 g. of crystals, M.P. 118–120° C.

Analysis.—Calc. for $C_{13}H_{16}F_3NO$ (percent): N, 5.41. Found (percent): N (basic), 5.45.

The hydrochloride salt when recrystallized from acetone and dried at 80°, melted 186–188° C.

Analysis. — Calc. for $C_{13}H_{17}ClF_3NO$ (percent): C, 52.81; H, 5.80; Cl, 11.98. Found (percent): C, 52.55; H, 5.85; Cl (ionic), 12.07.

EXAMPLE 18

4-(α-hydroxy - 4 - methoxybenzyl)piperidine was prepared similarly from 4-(p-methoxybenzoyl)pyridine and melted 94–97° C. from hexane.

dropwise a solution of 40.8 g. (0.26 mole) of aluminum chloride in 750 ml. of ether. The mixture was stirred for 1 hour at room temperature and then there was added slowly a solution of 102 g. (0.6 mole) of 4-benzylpyridine in 500 ml. of ether. The mixture was heated for 4 hours at reflux cooled and treated, dropwise, with excess 10% hydrochloric acid. The water layer was separated, treated with tartaric acid followed by the addition of excess 20% sodium hydroxide and extracted with ether. The dried ether solution was concentrated and vacuum distilled to give 92 g. (88%) of product, B.P. 90–98° C. (0.3 mm.), $n_D^{25}$ 1.5570.

Analysis. — Calc. for $C_{12}H_{15}N$ (percent): N, 8.09. Found (percent): N (basic), 8.06.

The hydrochloride salt, melted 177.5–178.5° C. when recrystallized from ethanol-ethyl acetate and dried at 80° C.

Analysis.—Calc. for $C_{12}H_{16}ClN$ (percent): C, 68.72; H, 7.69; Cl (ionic), 16.91. Found (percent): C, 68.46; H, 7.81; Cl (ionic), 16.90.

EXAMPLE 21

4-(2,4-dinitrobenzyl)piperidine hydrochloride

To a cooled solution of 106 g. (0.60 mole) of 4-benzyl-piperidine in 200 ml. of concentrated sulfuric acid was added dropwise over a 2 hour period a solution of 63.5 g. (0.70 mole) of concentrated nitric acid in 125 ml. of concentrated sulfuric acid. The mixture was stirred for 16 hours at room temperature and then it was cooled and made basic with 50% sodium hydroxide and extracted with ether. The dried ether extracts were cooled and etheral hydrogen chloride added to precipitate a white hygroscopic residue that was recrystallized several times from acetonitrile-ethylacetate and then finally from ethanol to give 4.3 g. of product that melted 217–217.5° C. after drying at 80° C.

*Analysis.*—Calc. for $C_{12}H_{16}ClN_3O_4$ (percent): C, 47.75; H, 5.35; Cl, 11.75. Found (percent): 48.20; H, 5.46; Cl (ionic), 11.82.

EXAMPLE 22

4-[p-(N-hydroxyacetamido)benzyl]piperidine

A mixture of 20 g. (0.09 mole) of 4-(p-nitrobenzyl) pyridine in 125 ml. of acetic acid containing 0.10 mole of acetic anhydride and 0.6 g. of platinum oxide was shaken in a Parr hydrogenator at an initial pressure of 50 lbs./sq. in. of hydrogen. The initial reduction was exothermic (temperature ≈60° C.) and the shaker was stopped after 15 minutes and allowed to cool. The shaking was then continued until the hydrogen absorption was complete (≈5 hours). The catalyst was filtered off and the acetic acid solution concentrated leaving a residue that was dissolved in ice water, made basic with solid potassium carbonate and extracted with chloroform. The dried chloroform extract was concentrated leaving a tacky solid that was twice crystallized from isopropanol to give 3.0 g. of product, M.P. 161–162° C.

*Analysis.*—Calc. for $C_{14}H_{20}N_2O_2$ (percent): N (basic), 6.63. Found (percent): N (basic), 5.58.

The hydrochloride salt, recrystallized from isopropanol-ethyl acetate, melted 184–185° C.

*Analysis.*—Calc. for $C_{14}H_{21}ClN_2O_2$ (percent): C, 59.04; H, 7.43; Cl, 12.45; O, 11.24. Found (percent): C, 59.06; H, 7.51; Cl (ionic), 12.45; O, 11.25.

Demonstration of antidepressant activity 4-benzylpiperidine, in the form of the hydrochloride salt, has been tested in mice, rats, cats, dogs and monkeys. It has been found to be an active antidepressant in all of these species. The compound has been found (in both mice and rats) to have antidepressant effect at dosages lower than the minimum dosage at which mild stimulation is observed. It does not appear to possess significant antichlorinergic activity in mammals, which is a frequent side effect of many antidepressants. A mild appetite suppressant activity is also found with 4-benzylpiperidine.

The therapeutic index of 4-benzylpiperidine is apparently rather high, as is evidenced by the following data showing $LD_{50}$, $ED_{50}$ and neurotoxicity ($NTD_{50}$) in mice and rats:

TABLE III.—$LD_{50}$ (mg./kg.) of 4-benzylpiperidine

In mice:
  Intraperitoneal _____ 95.0
  Oral _____ 190
  Intravenous _____ 38.8

In rats:
  Intraperitoneal _____ 82.0
  Oral _____ 540

TABLE IV.—Minimum effective dose in mice $ED_{50}$ (mg./kg.) of 4-benzylpiperidine [1]

Intraperitoneal:
  Pretreatment _____ 2.1
  Simultaneous _____ 0.9
Oral—Preatment _____ 2.3
Therapeutic index—($LD_{50}/ED_{50}$) _____ 45.2

[1] Tested by measuring the antagonism of depression induced by tetrabenazine methanesulfate. Groups of 10 mice were each given 32 mg./kg. of tetrabenazine methanesulfate intraperitoneally either 30 minutes after injection of the drug or vehicle (pretreatment), or simultaneously with the drug or vehicle. When the drug was tested orally, it was administered 60 minutes prior to injection with tetrabenazine. Inhibition of depression as indicated by degree of increased spontaneous activity and ptosis reversal was studied by observing each mouse placed in the center of a 12-inch horizontal disc for a 10 second period exactly 30 minutes after tetrabenazine administration.

TABLE V.—Neurotoxicity ($NTD_{50}$) of 4-benzylpiperidine [1]

Mice _____ 41.0
Rats _____ 47.0

[1] Neurotoxicity is defined as the dose necessary to cause 50 percent of mice trained to walk a stationary rod to fall at the time of peak drug effect. In rats, neurotoxicity was determined by the ability of the animal to stay on a rotating rod using the method of Dunham and Miya (J. Amer. Pharm. Assoc., 46:208, 1957). The drug was administered intraperitoneally. The time to peak effect was 15–30 minutes after drug administration for both species.

In male Long Evans rats, 4-benzylpiperidine was found to possess antidepressant activity in dosages as low as 2.5 mg./kg. The drug was administered intraperitoneally 60 minutes prior to administration (I.P.) of 18 mg./kg. of tetrabenazine.

Several other 4-substituted-piperidines were tested in mice for antidepressant activity. The compounds were each evaluated in 10 mice at a dose of 25 mg./kg. (I.P.) given 30 minutes prior to 32 mg./kg. (I.P.) of tetrabenazine methanesulfonate. Assessment of spontaneous activity for each group of 10 mice was made individually 30 minutes later on a 12-inch horizontal disc. Activity was graded as:

0—(none)
1—(slight)
2—(moderate)
3—(complete antagonism of tetrabenazine)

Mean group activity scores were obtained and are displayed below in Table VI. For comparison purposes, imipramine, a well known antidepressant, after doses of 5 to 10 mg./kg. gives an activity score of 1.0–1.5.

TABLE VI.—Antidepressant actiivty

| Compound: | Activity score |
|---|---|
| 4-(2-phenylethyl)piperidine | 0.7 |
| 4-benzylpiperidine | 2.7 |
| 4-benzylpiperidine (at 10 mg./kg.) | 1.5 |
| 4-benzylpiperidine (at 5 mg./kg.) | 1.0 |
| 4-cyclohexylmethylpiperidine | 1.7 |
| 4-(p-methoxybenzyl)piperidine | 1.6 |
| 4-(p-chlorobenzyl)piperidine | 1.2 |
| 4-(o-methylbenzyl)piperidine | 1.4 |
| 4-(p-aminobenzyl)piperidine | 1.5 |
| 4-benzoylpiperidine | 0.9 |
| 4-benzyl-3-piperideine | 0.5 |
| 4-(p-methoxy-alpha-hydroxybenzyl)piperidine | 0.6 |
| 4-[p-(N-hydroxyacetamido)benzyl]piperidine | 0.9 |
| 4-phenyl-3-piperideine | 1.1 |
| 4-phenylpiperidine | 1.6 |
| N-methyl-4-phenyl-3-piperideine | 2.0 |

4-benzylpiperidine is a potent vaso-dilator, and may therefore be useful in the treatment of cerebro- and cardio-vascular disorders. The vaso-dilation effect has been observed in dogs and cats after intravenous injections at dosage rates of 1 mg./kg. and higher.

What is claimed is:

1. A method which comprises administering to a mammal evidencing depression a dose sufficient to evoke an antidepressant response of a compound selected from the group consisting of 4-benzylpiperidine, 4-cyclohexylmethylpiperidine, 4-(p-methoxybenzyl)piperidine, 4-(p-chlorobenzyl)piperidine, 4-(p-aminobenzyl)piperidine, 4-[p-(N-hydroxyacetamido)benzyl]piperidine and 4 (o - methylbenzyl)piperidine; or a nontoxic, pharmacologically acceptable addition salt thereof.

2. The method of claim 1 wherein said compound is 4-benzylpiperidine.

References Cited

UNITED STATES PATENTS

| | | | |
|---|---|---|---|
| 2,830,057 | 4/1958 | Hoffmann et al. | 260—290 X |
| 2,891,066 | 6/1959 | Parcell | 260—294.3 A |

OTHER REFERENCES

Current Therapy (1966), pp. 615–621.

STANLEY J. FRIEDMAN, Primary Examiner

U.S. Cl. X.R.

260—290, 293, 294, 294.7, 295